US009152785B2

(12) United States Patent
Ezzat (10) Patent No.: US 9,152,785 B2
(45) Date of Patent: Oct. 6, 2015

(54) PROVIDING A FLEXIBLE PROTECTION MODEL IN A COMPUTER SYSTEM BY DECOUPLING PROTECTION FROM COMPUTER PRIVILEGE LEVEL

(75) Inventor: Ahmed K. Ezzat, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2141 days.

(21) Appl. No.: 10/769,594

(22) Filed: Jan. 30, 2004

(65) Prior Publication Data

US 2005/0172138 A1    Aug. 4, 2005

(51) Int. Cl.
  *G06F 21/52* (2013.01)
  *G06F 9/46* (2006.01)
  *G06F 12/14* (2006.01)
  *G06F 21/62* (2013.01)

(52) U.S. Cl.
  CPC ............... *G06F 21/52* (2013.01); *G06F 9/468* (2013.01); *G06F 12/1491* (2013.01); *G06F 21/62* (2013.01)

(58) Field of Classification Search
  CPC ......................... G06F 12/1416; G06F 12/1419
  USPC ......................................................... 713/189
  See application file for complete search history.

(56) References Cited

U.S. PATENT DOCUMENTS

| | | | |
|---|---|---|---|
| 4,525,780 A | | 6/1985 | Bratt |
| 5,469,556 A | | 11/1995 | Clifton |
| 6,125,447 A | | 9/2000 | Gong |
| 6,192,476 B1 * | | 2/2001 | Gong ................................ 726/4 |
| 6,546,546 B1 | | 4/2003 | Van Doorn |
| 6,691,230 B1 * | | 2/2004 | Bardon ........................... 726/27 |
| 6,915,338 B1 * | | 7/2005 | Hunt et al. .................... 709/220 |
| 7,089,242 B1 * | | 8/2006 | Chan et al. ......................... 707/9 |
| 7,131,143 B1 * | | 10/2006 | LaMacchia et al. ............ 726/30 |

FOREIGN PATENT DOCUMENTS

JP    2002-505476    9/1999

OTHER PUBLICATIONS

"The C Book—Structures" © 2003 GBDirect (verified date of Jun. 16, 2003 from the Internet Archive) (10 pages) http://web.archive.org/web/20030616183904/http://publications.gbdirect.co.uk/c_book/chapter6/structures.html.*
Sebesta, Robert. "Concepts of Programming Languages, Third Edition" © 1996 Addison-Wesley Publishing Co. Inc. (pp. 79-81, 95-97, 422-425, 570-571, and 595).*
Barr, Michael. "Programming Embedded Systems in C and C++" © 1999 O'Reilly Media Inc. (pp. 145-147).*
Dave Marshall. "Remote Procedure Calls (RPC)" Published Jan. 5, 1999 (13 pages) http://www.cs.cf.ac.uk/Dave/C/node33.html.*

(Continued)

*Primary Examiner* — Joseph P Hirl
*Assistant Examiner* — Thomas Gyorfi
(74) *Attorney, Agent, or Firm* — Hewlett-Packard Patent Department (57) ABSTRACT

Methods and systems for providing a flexible protection model in a computer system by decoupling protection from privilege are described. Information describing a relationship between the two or more domains that define types of protection and portions of code is received. The portions of code with the multiple domains that provide fine granularities of protection can be executed in the same privilege level. The relationship is not required to be linear. In addition, the overhead associated with crossing protection domains is relatively low with respect to traditional operating system context switching overhead.

19 Claims, 7 Drawing Sheets

(56) References Cited

OTHER PUBLICATIONS

Ken Arnold and James Gosling. "The Java Programming Language" © 1996 Sun Microsystems Inc. Excerpt from Appendix A (pp. 271-293).*

Arthur van Hoff, Johnathan Payne. "Class java.io.File" Version 1.34, Oct. 22, 1995 (5 pages) http://www.tns.lcs.mit.edu/manuals/java-api-old/java.io.File.html.*

Arthur van Hoff. "Class java.io.FileInputStream" Version 1.23, Aug. 11, 1995 (3 pages) http://www.tns.lcs.mit.edu/manuals/java-api-old/java.io.FileInputStream.html.*

Arthur van Hoff. "Class java.io.FileOutputStream" Version 1.17, Aug. 10, 1995 (3 pages) http://www.tns.lcs.mit.edu/manuals/java-api-old/java.io.FileOutputStream.html.*

Yo Furukawa, Protection Domain Reduction As A Local Security Support For Open Distributed Systems, Information Processing Society of Japan, Feb. 26, 1998.

Tsutomu Kindaichi, HyperITRON and mu-TRON 4.0/PX specification, Interface, vol. 29, No. 2, Japan, CQ Publishing Co., Feb. 1, 2003, p. 122-129.

* cited by examiner

PROVIDING A FLEXIBLE PROTECTION MODEL IN A COMPUTER SYSTEM BY DECOUPLING PROTECTION FROM COMPUTER PRIVILEGE LEVEL

TECHNICAL FIELD

Embodiments of the present invention relate to protecting information in a computer system. More specifically, embodiments of the present invention relate to protecting information associated with a computer system by decoupling the protection of the information from the privilege level associated with accessing the information.

BACKGROUND ART

One problem associated with computer systems today is protecting information in a computer system from undesirable access which might be accidental or malicious. For example, it may not be desirable for users to be able to determine how certain code works, the data the code operates on, or the data structures in which the data is stored in. Information, as used herein, includes but is not limited to code, data, and/or the format that the data is stored in (also known as a "data structure"). Furthermore, for purposes of the present application, activities such as accessing, modifying and/or executing information shall be referred to hereinafter as "accessing."

In computer terminology, "privilege" determines what actions code is allowed to perform on information in a computer system. In most operating systems, the actions that code is allowed to perform is determined by what the privilege level the code executes or resides in. For example, usually code executes in one of two privilege levels known as kernel and user. Further, code that resides in the kernel has an unlimited amount of power to perform actions, such as accessing information any where in the computer system. In contrast, code that resides in the user level has a limited amount of power to perform actions. For example, code in the user level can not access directly code or data in the kernel.

In computer terminology, "protection" refers to protecting information in the computer system from various actions being performed on that information. For example, code or data that resides in the kernel are protected from users of the computer system accessing that code or data either unintentionally or with malicious intent. Similarly, the code and data in the kernel are protected from being accessed directly by code in the user level. In contrast, code and data in the user level may be accessed by users either unintentionally or with malicious intent.

Typically, operating systems reside in the kernel and applications reside in the user level. Operating system code has a higher level of protection than user applications have. However, in general there is not a fine granularity of protection for either the operating system or for applications. For example, an application may include a set of modules and/or libraries. Some of these modules and/or libraries may come from a third party and therefore are not highly trusted. It would be desirable to provide protection in a flexible manner for certain modules and/or services in the libraries of the application in a flexible manner from other modules and/or services in the libraries.

In another example, vendor supplied application libraries typically contain critical data that might be corrupted by bad application code such as application code that de-references an un-initialized pointer. In these situations and others, it would be highly desirable to control the access of these modules as well as what these modules access whether unintentional or with malicious intent in order to provide more application robustness.

DISCLOSURE OF THE INVENTION

The present invention enables a flexible fine granularity of protection independent of the privilege level. The present invention allows that flexibility with highly reduced overhead. Furthermore, code that does not need a fine granularity of protection will not incur any additional overhead. The present invention provides desired protection to an application module without the need to move that module to the kernel. The present invention allows the program developers to customize the level of protection to meet their needs at any privilege level without involving or impacting code in other privilege levels.

Embodiments of the present invention pertain to methods and systems that provide a fine granularity of protection in a computer system within the same privilege level, i.e., in other words by decoupling protection from privilege level. In one embodiment, information describing two or more types of protection is received. Further, information describing a relationship between the two or more types of protection and portions of code is received. The relationship is not required to be linear. The portions of code are executed in the same privilege level. The information describing the two or more types of protection and the relationship are associated with the portions of code.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

The drawings referred to in this description should not be understood as being drawn to scale except if specifically noted.

DETAILED DESCRIPTION FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Software System and Functional Overviews

Figure 1A:
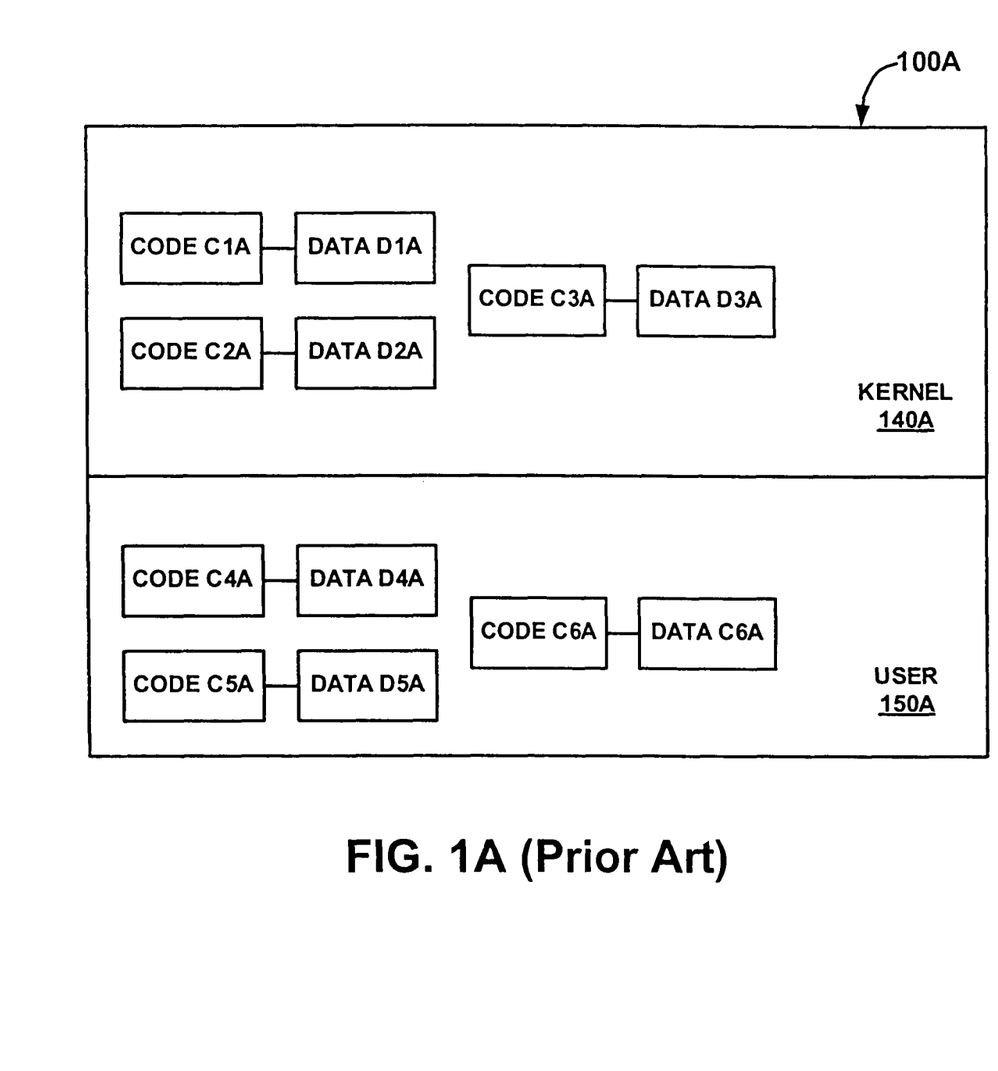
FIG. 1A is a block diagram of a computer system where parts of the application execute in the kernel.

As already stated, a problem exists with regards to protecting code and data at a fine granularity within an application or within the kernel from undesirable access whether unintentionally or with malicious intent. One solution to the problem is to move the parts of an application that need protection from the rest of the application to the kernel. This approach commonly involves what is known as "context switching," as will be described in more detail. Prior Art FIG. 1A is a block diagram of a computer system where parts of the application execute in the kernel. For example, part of the application code (C1A, C2A, C3A) and the data (D1A, D2A, D3A) that code (C1A, C2A, C3A) operates on resides in the kernel 140A and part of the application code (C4A, C5A, C6A) and the data (D4A, D5A, D6A) that code (C4A, C5A, C6A) operates on resides in the user level 150A. The code (C1A, C2A, C3A) and data (D1A, D2A, D3A) of the application that resides in the kernel 140A is protected from having users access it. However, this solution has many disadvantages.

One disadvantage is the overhead that results from context switching between code (C4A, C5A, C6A) executing in the user level 150A and the code (C1A, C2A, C3A) executing in the kernel 140A. For example, when the code (C4A, C5A, C6A) in the user level 150A invokes code (C1A, C2A, C3A) in the kernel 140A, the "context", which includes the contents of a very large number of registers, needs to be saved. When control returns from the code (C1A, C2A, C3A) in the kernel 140A to the code (C4A, C5A, C6A) in the user level 150A, the "context" needs to be restored. Numerous CPU cycles are required to save and restore the contents of these registers during context switches.

A second disadvantage is that the part of the application (C1A, C2A, C3A) that resides in the kernel may destabilize the kernel. In order for a computer to work reliably, the operating system needs to be stable. The main purpose of the kernel 140A is to provide a high level of privilege and protection to the operating system. Potentially, any code (C1A, C2A, C3A) that is introduced to the kernel 140A may have bugs and therefore, may destabilize the operating system.

A third disadvantage is that application code may not be allowed to execute in the kernel. As already discussed, the operating system needs to be stable. Therefore, the program developers in charge of the code that executes in the kernel may not allow the program developers in charge of the application to place parts of the application in the kernel.

A fourth disadvantage is that once a portion of code for an application is moved to the kernel, it can no longer call other application procedures. In other words, call backs are no longer possible. In many circumstances this is not acceptable.

Figure 1B:
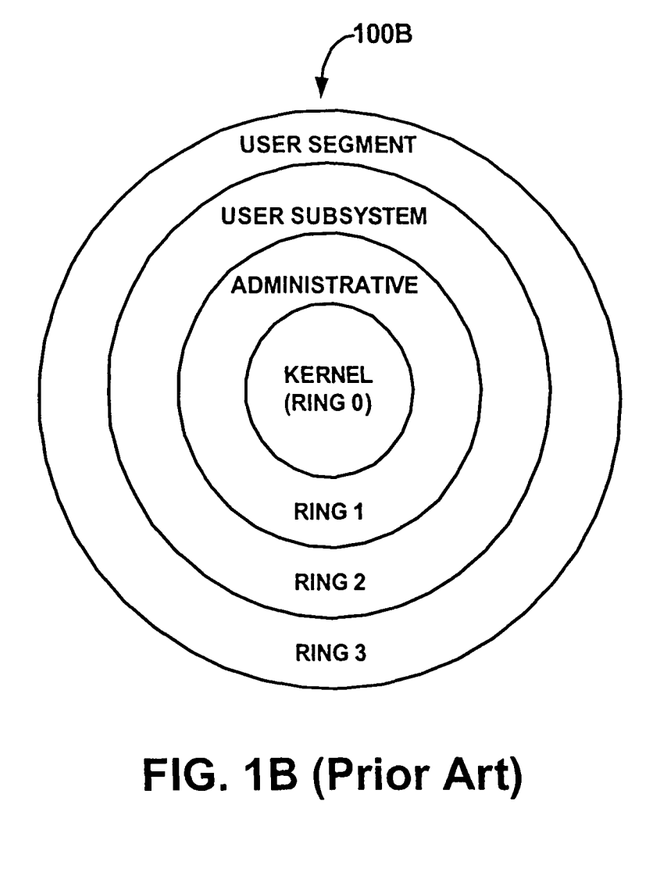
FIG. 1B is a block diagram of the Multics architecture.

A second solution to the problem involves dividing the user level of privilege into several linear levels of trust (referred to hereinafter as "Multics"). Prior Art FIG. 1B is a block diagram of the Multics architecture. For example, the kernel has the highest level of trust at ring 0 and the user level is divided into several lower levels of trust (rings 1, 2, 3).

Code that can cause more damage is typically subjected to greater debugging and, as a result, has a higher level of trust. For example, the kernel at ring 0 can cause the most amount of damage, therefore, the code in ring 0 is debugged the most and is the most trusted code. Further, ring 0 is provided with the most amount of protection. In contrast, the code in ring 3 is debugged the least, therefore, ring 3 is trusted the least and is provided with the lowest amount of protection. The following rules summarize how the linear levels of trust work in Multics.

1. code in ring(j) should be able to call code in ring(j) or code in any ring number greater than "j."
2. code in ring(j) should be denied the ability to directly call code in ring(i) where "i" is less than "j", however, ring(j) can call code in ring(i) in a controlled manner for example by calling a "gatekeeper", which resides in the kernel at ring 0. In so doing, the "gatekeeper" context switches between the rings.
3. code in ring(j) must never be given access to data associated with ring(i) where "i" is less than "j."

One disadvantage with this second solution is the overhead that Multics introduces. For example, context switching is required between rings and context switching, as already discussed, introduces significant overhead.

A second disadvantage for the second solution is the lack of flexibility. The scheme is strictly linear, and as a result callbacks are not allowed. For example ring 1 can access ring 2 but not vice versa. Callbacks are popular programming style and frequent enough in many applications.

For these and other reasons, a method and a system that does not introduce significant overhead would be valuable. A method and system that does not de-stabilize the kernel would also be valuable. A method and system for defining a flexible non-linear relationship between different portions of code and types of protection, which allows for callbacks, would be valuable. A method and a system that enables a protection model with fine granularity within the same privilege level (i.e., user or kernel) would be valuable. A method and system that does not require program developers working on an application to obtain approval from program developers working on the kernel to implement the protection they seek in order to preserve the integrity of their code would also be valuable.

In computer terminology, "privilege" determines what actions code is allowed to perform on information in a computer system. In computer terminology, "protection" refers to protecting information in the computer system from various actions being performed on that information. In typical systems today, protection of information is directly correlated with the privilege level the information is associated with. For example, in Prior Art FIG. 1A, code (C1A, C2A, C3A) and data (D1A, D2A, D3A) residing in the kernel 140A have a high level of protection and privilege. In contrast, code (C4A, C5A, C6A) and data (D4A, D5A, D6A) residing in the user level 150A have a low level of privilege and protection.

In yet another example of coupling privilege and protection, Prior Art FIG. 1B depicts code and data that is provided different levels of protection and privilege by associating the code and data with linear levels of trust, e.g., rings. The levels of trust are determined by how well code is debugged. The more thoroughly the code is debugged the higher the level of trust the code is assigned. The higher the level of trust, the higher the level of privilege and protection the code is given. Therefore, the relationship between the code in the rings and the protection the code is given thru the levels of trust is linear. For example, the code in ring(j) may invoke the code in ring(i) where "i" is less than "j", therefore, the code in ring(j) has a higher level of privilege than the code in ring(i). Also, the code in ring(i) may not invoke the code in ring(j), therefore, the code in ring(j) is protected from the code in ring(i). According to one embodiment, the concept of protection is extended by decoupling the level of privilege that information is associated with from the type of protection that the information is given.

Figure 2A:
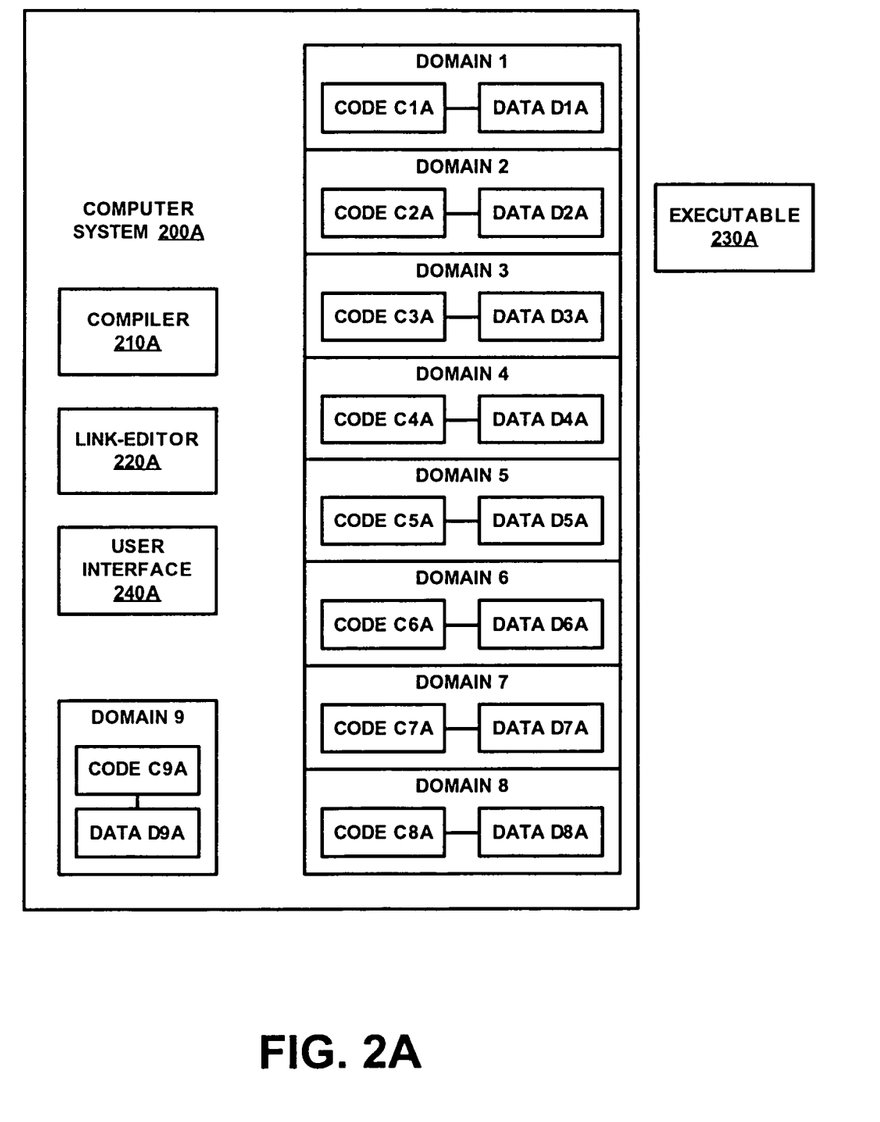
FIG. 2A is a block diagram of an exemplary computer system for compiling and link-editing portions of code of an application according to embodiments of the present invention.

FIG. 2A is a block diagram of an exemplary computer system for compiling and link-editing portions of code according to embodiments of the present invention. The blocks in FIG. 2A can be arranged differently than as illustrated, and can implement additional features that are not described herein.

According to one embodiment of the present invention, protection is decoupled from privilege by dividing portions of code and/or data into domains and defining types of protection with domain attributes. For example, software system 200A includes portions of code (C1A, C2A, C3A, C4A, C5A, C6A, C7A, C8A, C9A) and data (D1A, D2A, D3A, D4A, D5A, D6A, D7A, D8A, D9A) that are divided into domains 1-9. Software system 200A further includes a user interface 240A that may receive information defining types of protection, such as domain attributes, a compiler 210A, a link-editor 220A, and an executable 230A.

In another embodiment of the present invention, the user interface 240A may receive information describing the types of protection. For example, user interface 240A may receive a domain attribute specifying that the code (C2A) of domain 2 may invoke the code (C1A) of domain 1. If user interface 240A does not receive information specifying that the other domains 3-9 may invoke code (C1A) then code C1A is "protected" from the code of domains 3-9 invoking code C1A. Domain attributes will be described in more detail hereinafter.

In yet another embodiment, the user interface 240A receives information that describes a relationship between the types of protection and the portions of code. Continuing the example, if user interface 240A receives information specifying that the code (C2A) of domain 2 may invoke the code (C1A) of domain 1, a relationship between the domains 1 and 2 is described. Further, the information that user interface 240A received also specifies a relationship between domain 2 and the other domains 3-9, e.g., that code (C2A) of domain 2 may not invoke the code (C4A, C5A, C6A, C7A, C8A, C9A) of the other domains (3-9).

In the Multics architecture, the relationship between the code in the rings and the protection the code is given thru the levels of trust is linear. However, in an embodiment of the present invention, the relationship between the types of protection and the portions of code is not required to be linear. Continuing the example, if user interface 240A also receives information specifying that code C3A of domain 3 may invoke the code C4A of domain 4, there is no linear relationship between codes C1A-C4A of domains 1-4 as to which code may invoke the other code of C1A-C4A.

By dividing the code of an application into portions, such as domains, and associating types of protection, such as domain attributes, with those portions of code, embodiments of the present invention decouple privilege from protection. Hence, the code (C1A, C2A, C3A, C4A, C5A, C6A, C7A, C8A, C9A) and data (D1A, D2A, D3A, D4A, D5A, D6A, D7A, D8A, D9A) can be provided a high level of protection while the code (C1A, C2A, C3A, C4A, C5A, C6A, C7A, C8A, C9A) is executing with a low level of privilege, such as the user level, while at the same time reducing overhead by avoiding context switching, preserving kernel stability, and eliminating the need for application program developers to obtain approval from kernel program developers to place the application code in the kernel, as will become more evident.

As depicted in FIG. 2A, compiler 210A compiles and link-editor 22A link edits the portions of code (C1A, C2A, C3A, C4A, C5A, C6A, C7A, C8A, C9A) and data (D1A, D2A, D3A, D4A, D5A, D6A, D7A, D8A, D9A) to produce executable 230A. According to the present embodiment, the link-editor 220A associates the information describing the types of protection and information describing the relationship with the portions of code (C1A, C2A, C3A, C4A, C5A, C6A, C7A, C8A, C9A). Continuing the example, link-editor 220A may store information describing that the code (C2A) of domain 2 may invoke the code of domain 1 (C1A) in the headers of executables for code C2A and/or C1A, as will be described in more detail.

Sometime code is not executed on the same computer that it was compiled and link-edited on. For example, executable 230A, which was compiled and link-edited on software system 200A, may be executed on another computer.

Figure 2B:
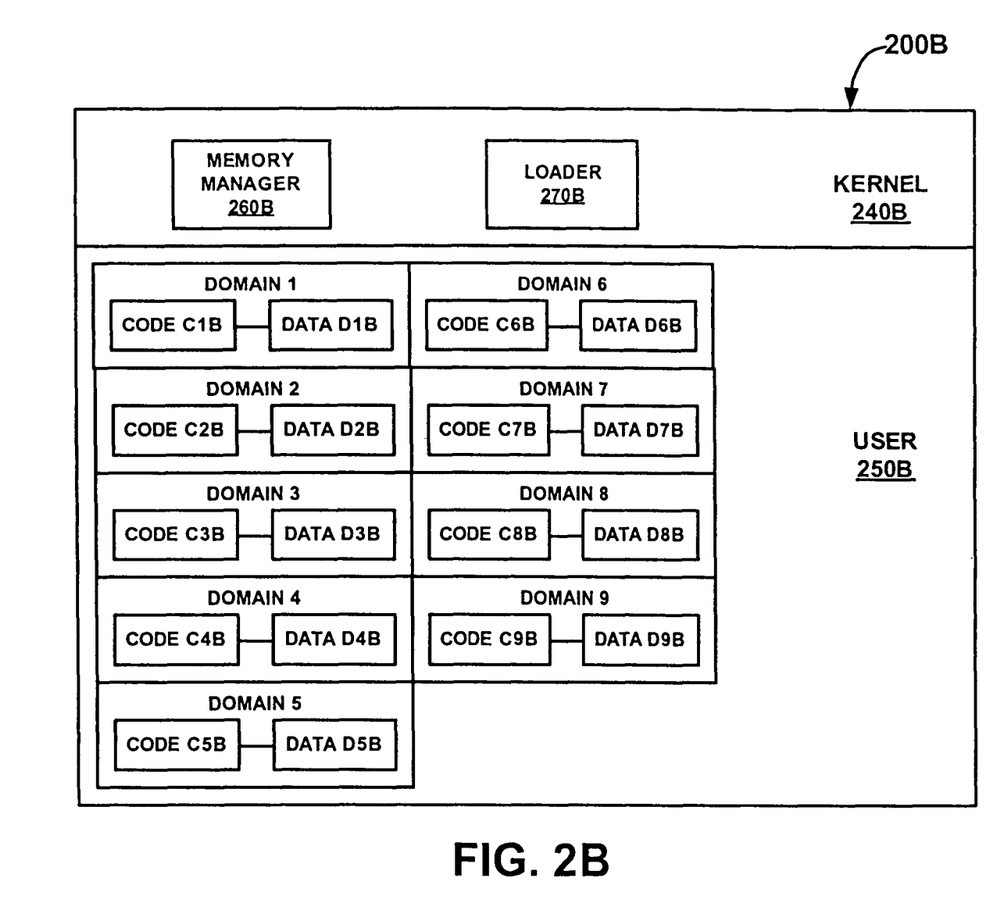
FIG. 2B is a block diagram of an exemplary computer system depicting both kernel and application code according to embodiments of the present invention.

FIG. 2B is a block diagram of an exemplary software system for executing portions of code according to embodiments of the present invention. The blocks in FIG. 2B can be arranged differently than as illustrated, and can implement additional features that are not described herein. Executable 230A, depicted on FIG. 2A, may be executed on software system 200B, as depicted in FIG. 2B.

Software system 200B depicts a kernel 240B and a user level 250B, code (C1B, C2B, C3B, C4B, C5B, C6B, C7B, C8B, C9B) and data (D1B, D2B, D3B, D4B, D5B, D6B, D7B, D8B, D9B) that is divided into domains 1-9. Software system 200B also includes a loader 270B in the kernel 240B that loads the portions of code (C1B, C2B, C3B, C4B, C5B, C6B, C7B, C8B, C9B) and data (D1B, D2B, D3B, D4B, D5B, D6B, D7B, D8B, D9B) into the user level 250B from executable 230A of FIG. 2A. A memory manager 260B also resides in the kernel 240B. Memory manager 260B pages the code (C1B, C2B, C3B, C4B, C5B, C6B, C7B, C8B, C9B) and data (D1B, D2B, D3B, D4B, D5B, D6B, D7B, D8B, D9B) in and out of main memory as the code (C1B, C2B, C3B, C4B, C5B, C6B, C7B, C8B, C9B) and data (D1B, D2B, D3B, D4B, D5B, D6B, D7B, D8B, D9B) is accessed.

The present invention in one embodiment, allows portions of code to be executed in the same privilege level of the computer system. To continue the example, the portions of code (C1B, C2B, C3B, C4B, C5B, C6B, C7B, C8B, C9B) and data (D1B, D2B, D3B, D4B, D5B, D6B, D7B, D8B, D9B) are for an application and therefore may be executed in the user level 250B.

The loader 270B extracts the information describing the types of protection and the information describing the relationship from the portions of code, according to one embodiment. Continuing the example, the loader 270B may extract the information describing that code C2B of domain 2 may invoke the code C1B of domain 1 from the header of the executable for code C2B where link-editor 220A of FIG. 2A placed it.

In another embodiment, the memory manager 260B determines whether portions of code are allowed to access other portions of code based on the information describing the types of protection. Continuing the example, the type of protection associated with code C1B indicates that it may invoke the code of C2B. However, the type of protection associated with code C2B may indicate that it will not allow code C1B to invoke it. When the code of C1B invokes the code C2B the memory manager 260B may compare the types of protection associated with code C1B and C2B to determine that code C1B will not be allowed to invoke code C2B, as will be described in more detail hereinafter.

Context switching does not need to be performed when portions of code invoke each other, in yet another embodiment of the present invention. For example, referring to FIG. 2B, if code C1B invokes code C2B, context switching may not be required because their respective types of protection indicate that C1B may invoke C2B. Thus, the overload in saving and restoring a large number of registers is avoided by the present embodiment.

Also in an embodiment of the present invention, some values associated with the types of protection may be stored in registers. These values may need to be stored and restored as execution control switches between domains (referred to hereinafter as "cross-domain switching). For example, if code C1B invokes code C2B, the contents of a register, which includes values for one or more domain attributes associated with domain 1, may be saved so that the register may be initialized with one or more values of domain attributes associated with domain 2. Upon return to code C2B, the saved contents of the register may be restored. Cross-domain switching does not require the overhead that context switching requires since a large number of registers are not being saved and restored.

In one embodiment of the present invention, the types of protection specify whether cross-domain switching is required or not. Continuing the example, the type of protection associated with code C2A may specify that cross-domain switching is required when code C2A invokes code C1A and the type of protection associated with code C3A may specify that cross-domain switching is not required when code C3A invokes code C4A, as will be described in more detail.

Domain Attributes

According to one embodiment, types of protection are defined by domain attributes. Examples of these domain attributes include, but are not limited to, a domain identifier, a Private Key, a SharedCode Key, a SharedData Key, an AllowOthers Key, and an AccessOthers Key. As will be described in more detail hereinafter several of the domain attributes may be specified as lists. For example, several keys may be associated with a particular domain for sharing code of other domains in the form of a SharedCode Key List, as will be described in more detail.

For the purposes of illustration, the following explanation shall refer to structures depicted in FIG. 2B.

According to one embodiment, the domain identifier specifies a unique value for a particular domain. For example, domains 1-9 may have respective unique domain identifiers PD-id1 to PD-id9. These domain identifiers may be used to identify the processes that result from executing code (C1B, C2B, C3B, C4B, C5B, C6B, C7B, C8B, C9B) associated with domains 1-9.

In another embodiment, the Private Key specifies a unique protection key per user context of a process, e.g., a unique value for protecting the context each user that concurrently uses a particular domain.

In yet another embodiment, the SharedCode Key specifies a value that a particular domain must use to access code associated with another domain. For example, the value, PK5, may be specified as the SharedCode Key that domain 1 must use to access the code C6B of domain 6.

Also, in an embodiment of the present invention, cross-domain switching does not need to be performed to access code using the SharedCode Key. To continue the example, cross-domain switching does not need to be performed when control switches between executing the code C6B with domain 6 and the code C1B of domain 1.

According to yet another embodiment, domain identifiers and SharedCode Key pairs are associated with a particular domain to indicate what keys the specified domain must use to access the particular domain. To continue the example, associating the domain identifier and SharedCode Key pair "PD-id1/PK5" with domain 6 indicates that domain 1 (e.g., the domain for PD-id1) must use SharedCode key PK5 when accessing the code C1B for domain 1.

A list of domain identifiers and SharedCode Keys (referred to hereinafter as a "SharedCode Key List") are associated with a particular domain to indicate what keys the specified domains must use to access the code of the particular domain, according to one embodiment. To continue the example, a SharedCode Key List "PD-id1/PK5: PD-id2/PK5:PD-id3/PK5" includes three domain identifier and SharedCode Key pairs separated by colons that may be associated with domain 6 to indicate that domain 1, domain 2, and domain 3, must use PK5 to access the code C6B of domain 6.

In another embodiment, a SharedCode Key to domain identifier pair of "*/PK5" may be associated with domain 6 to indicate that all other domains must use SharedCode Key PK5 to access the code C5B.

The SharedData Key specifies a value that a particular domain must use to access data associated with another domain, in another embodiment. For example, the value, PK6, may be specified as the SharedData Key that domain 1 must use to access the data D6B of domain 6. According to one embodiment, cross-domain switching does not need to be performed to access data using the SharedData Key. To continue the example, cross-domain switching does not need to be performed when the code C1B of domain 1 accesses the data D6B of domain 6.

Domain identifiers and SharedData Key pairs are associated with a particular domain to indicate what keys the specified domain must use to access the data of the particular domain, according to one embodiment. To continue the example, associating the domain identifier and SharedDataKey pair "PD-id1/PK6" with a particular domain, such as domain 6, indicates that domain 1 (e.g., the domain for PD-id1) must use SharedCode key PK6 when accessing the data D1B for domain 1.

A list of domain identifiers and SharedData Keys (referred to hereinafter as a "SharedData Key List") are associated with a particular domain to indicate what keys the specified domains must use to access the data of the particular domain, according to one embodiment. To continue the example, a SharedData Key List "PD-id1/PK6: PD-id2/PK7: PD-id4/PK8" includes three domain identifier and SharedData Key pairs separated by colons that may be associated with domain 6 to indicate that domains 1-4 must use keys PK6, PK7, PK8 respectively to access the data D6B of domain 6.

A domain identifier and SharedData Key pair, such as "*/PK9", may be associated with a domain, such as domain 6, to indicate that all other domains, e.g., "*", must use a SharedData Key, such as PK9, to access the data, such as D5B, according to one embodiment.

In one embodiment, the AllowOthers Key specifies a value that a particular domain must use to access code associated with another domain in conjunction with the particular domain performing cross-domain switching. For example, associating "PD-id5: PD-id6" with domain 3 indicates that cross-domain switching must be performed in order for the code (CB5, CB6) of domains 5 and 6 to access the code CB3 of domain 3. According to one embodiment, a list of domain identifier and AllowOthers Key pairs may be associated with a particular domain. For example, associating "PD-id5/PK3: PD-id6/PK3" may be associated with domain 3 indicating that the code of domains 5 and 6 may access the code of domain 3 using key PK3.

The AccessOthers Key specifies a value that is used to request access of code associated with a particular domain on behalf of another domain, in yet another embodiment. For example, PK8 may be specified as the key that domain 1 wants to use to access the code CB8 of domain 8 with. According to one embodiment, a list of domain identifier and AccessOthers Key pairs may be associated with a particular domain. For example, associating "PD-id8/PK8:PD-id9/PK9" with domain 1 indicates that code CB1 wants to access code CB8 and CB9 with the respective keys PK8 and PK9.

Also, in one embodiment, target domains' SharedCode Keys and SharedData Keys are compared to requesting domains' AllowOthers Keys to determine if the requesting domains may access the code of the target domains. To continue the example, the requesting domain 1's Allowothers-Keys "PD-id8/PK8:PD-id9/PK9" may be compared by link-editor 270B to the target domains' (e.g., domains 8 and 9) SharedCode Keys and SharedData Keys. If, for example, domain 8 has SharedCode Key indicating that domain 1 may use PK8 to access domain 8's code, then code C1B would be allowed to access code C8B.

An Implementation on the Itanium Architecture

Some computer architectures protect pages from being accessed without permission (also known as "page level protection"). For example, each page may have a key associated with it. Any code that requests to access that page must also have that key in order to gain permission to access that page. If the code uses that key to access the page, then the code is allowed to access the page. Otherwise, the code is denied access to that page.

According to one embodiment, the present invention may be implemented on Intel's Itanium processor family (IPF) architecture as well as on most modern microprocessors. In IPF, pages in memory have their own protection attributes, the form of keys, which are enforced by the hardware by comparing the pages' keys against attributes for the currently executing code associated with a particular domain in the form of a program or DLL. For example, according to one embodiment, IPF's protection key register (PKR) may contain values for domain attributes that map to the domains of code that is currently being executed, as will be described in more detail. The PKR is initialized to these values when control switches between portions of code, which is also known as "cross-domain switching."

For example, when the code of domain 1 is executing, the PKR may include values for domain attributes associated with domain 1. When control switches to another domain, such as domain 2, the contents of the PKR may be stored and the PKR may be initialized with the values for the domain attributes associated with domain 2. When control switches back to the code of domain 1, the contents of the PKR, which now contain the values of domain attributes associated with domain 2, are stored and the PKR is reinitialized back with the values of the domain attributes associated with domain 1 are.

The PKR contains, among other things, the value of the Private Key attribute associated with the domain of the code or data that is being executed, according to yet another embodiment. For example, when code C1B is being executed, the value of the Private Key attribute associated with domain 1 may be stored in the PKR.

According to one embodiment, the IPF architecture compares the value of domain attributes in the PKR to a key associated with a page when a portion of code requests to access to the page. If the key of the page is among the values in the PKR, then access is granted; otherwise, access is denied.

According to yet another embodiment, the linker may assign the DLL or program values for domain attributes, as already discussed herein. According to one embodiment, during link-edit, the AccessOthers key is a wish list that will be analyzed by the linker. In comparing the value of the AccessOthers key for one portion of code to the types of protection associated with other portions of code, the linker may change the value of the AccessOthers key. For example, if domain 1 specifies in the AccessOthers Key that it wants to access code CA8 with PK8 but domain 8 specifies in its SharedCode Key that code CA1 of domain 1 may not invoke CA8, then the linker may modify the AccessOthers Key for domain 1.

Also, the linker may generate stubs for procedures in the code for every domain, that will be accessed when that code is invoked by the code for other domains through a cross-domain switch, in yet another embodiment.

According to one embodiment, global variables associated with domains are protected by the domain attributes associated with the respective domains. For example, this can be accomplished by grouping the global variables on page boundaries.

Operational Examples

Figure 3A:
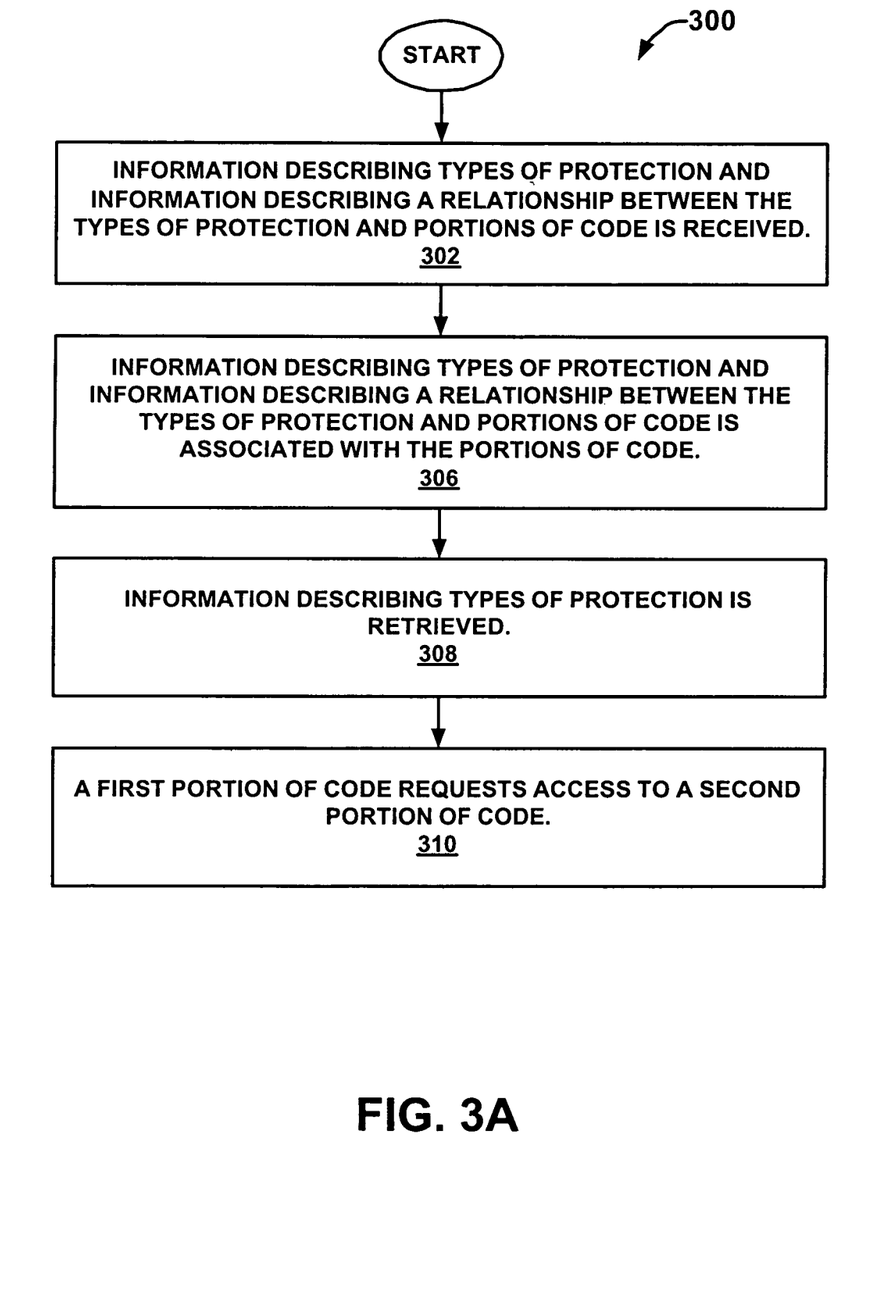
FIGS. 3A and 3B depict a flowchart for enforcing protection in a computer system within an application by decoupling protection from privilege according to embodiments of the present invention.
Figure 3B:
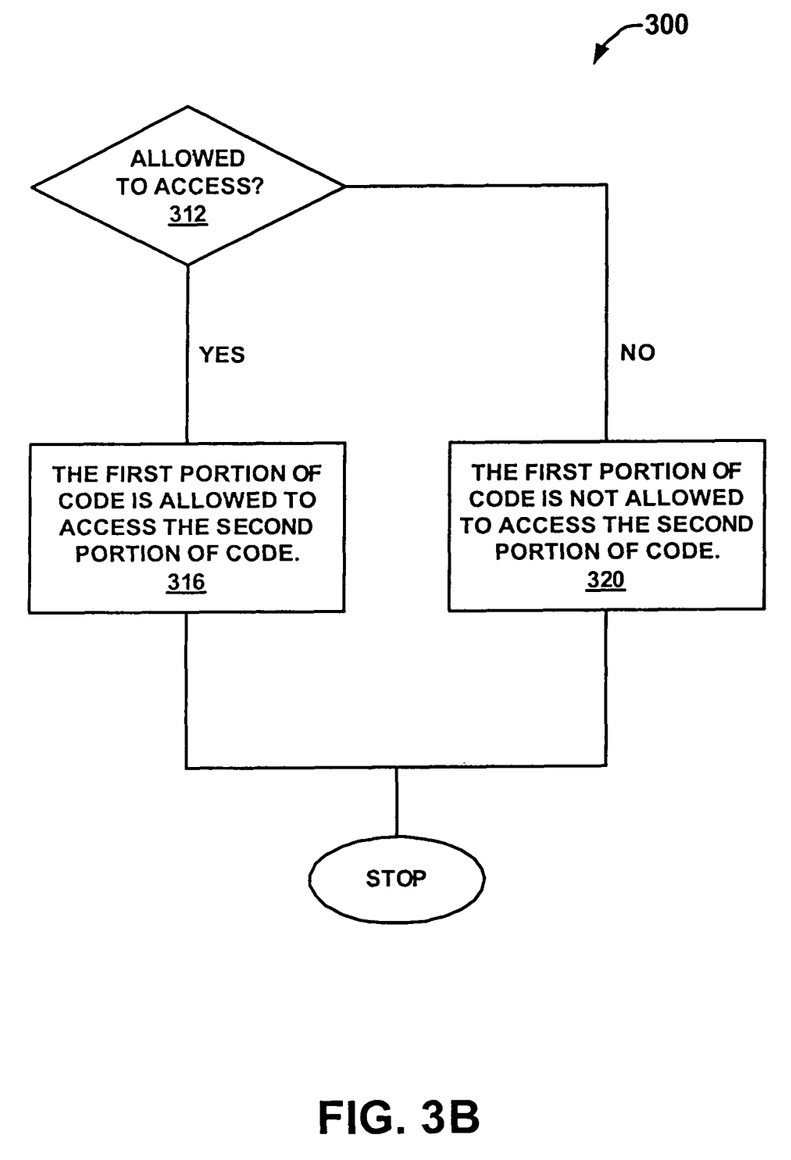

FIGS. 3A and 3B depict a flowchart 300 for enforcing protection in a computer system by decoupling protection from privilege according to embodiments of the present invention. Although specific operations are disclosed in flowchart 300, such operations are exemplary. That is, embodiments of the present invention are well suited to performing various other operations or variations of the operations recited in flowchart 300. It is appreciated that the operations in flowchart 300 may be performed in an order different than presented, and that not all of the operations in flowchart 300 may be performed. All of, or a portion of, the embodiments described by flowchart 300 can be implemented using computer-readable and computer-executable instructions which reside, for example, in computer-usable media of a computer system or like device.

For the purposes of illustration, the discussion of flowchart 300 shall refer to the structures depicted in FIGS. 2A and 2B.

At 302 according to one embodiment, information describing types of protection and information describing a relationship between the types of protection and portions of code is received. For example, link-editor 220A receives information, as depicted in Table 1 below, from a user indicating that the domain attributes for domain id, Private Key, Shared Code Key List, or Access Others List may be associated with the respective domains 1, 4, 5:

TABLE 1

Information describing types of protection and information describing a relationship between the types of protection and portions of code

| Domain Name | Domain Attributes | Values associated with the Domain Attributes |
|---|---|---|
| Domain 1 | Domain ID | PD-id1 |
| | Private Key | PK1 |
| | Access Others List | PD-id4/PK7: PD-id5/PK5 |

TABLE 1-continued

Information describing types of protection and information describing a relationship between the types of protection and portions of code

| Domain Name | Domain Attributes | Values associated with the Domain Attributes |
|---|---|---|
| Domain 4 | Domain ID | PD-id4 |
| | Private Key | PK4 |
| | SharedCode Key List | PD-id1/PK4: PD-id5/PK4 |
| Domain 5 | Domain ID | PD-id5 |
| | Private Key | PK5 |
| | SharedCode Key List | PD-id1/PK5: PD-id4/PK5 |

In Table 1, the information that describes the types of protection include the values PD-id1, PD-id4, PD-id5 for the domain Ids, values PK1, PK4, PK5 for the Private Keys, and the values PK7, PK5 for the AccessOthers Key List, and PK4, PK5 for SharedCode Key List domain attributes. Since the domain attributes AccessOthers Key List and SharedCode Key List are in the form of domain id to key pairs, information describing the relationship between the types of protection and portions of code is defined with these two domain attributes.

Although there are other domains depicted in FIGS. 2A and 2B, for the sake of simplicity, this illustration shall be limited to domains 1, 4, 5.

At 306, the information describing the types of protection and the information describing the relationship is associated with the portions of code, according to another embodiment. For example, when the code C1A, C4A, C5A is compiled and link-edited, the link-editor 221 associates the values of the domain attributes depicted in table 1 with the portions of code C1A, C4A, C5A to produce executable 230A. More specifically, the values PD-id1, for domain id, PK1, for Private Key, and PD-id4/PK7: PD-id5/PK5, for AccessOthers Key List, may be placed in the header of the executable for the portion of code C1A. The domain attribute values depicted in table 1 for domains 4, 5 are associated with domains 4, 5 in a similar manner.

In comparing the value of the AccessOthers Key List for one portion of code to the types of protection associated with other portions of code, the link-editor 220A may change the value of the AccessOthers key. For example, link-editor 220A may compare value PD-id4/PK7 of the AccessOthers Key List for Domain 1 with the value PK4 of Private Key for Domain 4 and determine that although domain 1 requests to access code C4B with PK7, C4B can only be accessed with PK4. In this case, the link-editor 220A may modify the value PD-id4/PK7 to PD-id4/PK4. Alternatively, link-editor 220A may not modify the value and at execution time, domain 1's code C1B may be denied access to code C4B, as will be described in more detail.

At 308, the information describing the types of protection is retrieved. For example in yet another embodiment, the executable 230A, which includes executables for code C1B C4B, C5B, is executed on software system 200B depicted on FIG. 2B. In this case, while loader 270B loads the executable 230A into main memory, loader 270B retrieves the values for the domain attributes, as depicted in Table 1, from the executables for the portions of code C1B, C4B, C5B. According to one embodiment, the loader 270B passes the values of the domain attributes to the memory manager 260B.

At 310 according to another embodiment, a first portion of code requests to access a second portion of code. For example, referring to FIG. 2B, code C4B may request to access code C5B by invoking a procedure in code C5B.

In decision box 312, determine whether the first portion of code is allowed to access the second portion of code, according to one embodiment. Memory manager 260B detects that code C4B has requested to access code C5B. While executing code C4A, the PKR would include PK4, PK5, where PK4 is the value of domain 4's Private Key, and the SharedCode Key List of Domain 5 specifies that Domain 4 may share code from Domain 5 using PK5. The memory manager 260B determines whether code C4A may invoke code C5A. If the first portion of code is allowed to access the second portion of code, then operation 316 is executed; otherwise, operation 320 is executed.

At 316 according to yet another embodiment, the first portion of code is allowed to access the second portion of code. For example, since the PKR includes PK5, which is the value of Domain 5's Private Key, code C4A is allowed to access the code of C5A.

At 320, the first portion of code is not allowed to access the second portion of code, according to one embodiment. For example, if the PKR had not included PK5, the code C4A would not have been allowed to access the code of C5A.

As already stated, in one embodiment, the relationship between the types of protection and the portions of code is not required to be linear. However, although embodiments of the present invention do not require the relationship to be linear, embodiments of the present invention may still be used to implement a linear relationship. The following describes another operational example, where embodiments of the present invention are used to implement a Multics architecture with linear levels of trust.

TABLE 2

Multics architecture implemented with domains and domain attributes.

| LEVEL OF TRUST | RING | APPLICATION | VALUES OF DOMAIN ATTRIBUTES |
|---|---|---|---|
| Least trusted | Ring 3 | Main( ) | Domain ID: PD-id1 |
| | | | Private Key: PK1 |
| | | | SharedCode Key List: */PK11 |
| | | | SharedData Key List: */PK12 |
| | | | AllowOthers Key List: NULL |
| | | | AccessOthersKey List: NULL |
| Intermediate trust | Ring 2 | SQL/MX | Domain ID: PD-id2 |
| | | | Private Key: PK2 |
| | | | SharedCode Key List: NULL |
| | | | SharedData Key List: NULL |
| | | | AllowOthers Key List: PD-id1/PK2: PD-id3/PK2 |
| | | | AccessOthersKey List: PD-id1/PK1: PD-id3/PK3 |
| Most trusted | Ring 1 | User Library | Domain ID: PD-id3 |
| | | | Private Key: PK3 |
| | | | SharedCode Key List: NULL |
| | | | SharedData Key List: NULL |
| | | | AllowOthers Key List: PD-id1/PK3: PD-id2/PK3 |
| | | | AccessOthersKey List: NULL |

Referring to Table 2, according to one embodiment, while executing the code for domain 1, e.g., PD-id1, the PKR may include "PK1, PK11, PK12." The PKR includes PK1 because that is the Private Key of domain 1. The PKR includes PK11 because domain 1's SharedCode Key List indicates that all other domains, e.g., "*", may use PK11 to access Domain 1's code. PKR includes PK12 because domain 1's SharedData Key List indicates that all other domains, e.g., "*", may use PK11 to access Domain 1's data.

While executing the code for domain 2, e.g., PD-id2, according to one embodiment, the PKR may contain include "PK2, PK3, PK11, PK12." PKR includes PK2 because that is the Private Key of domain 2. PKR includes PK3 because domain 3's AccessOthers Key List indicates that domain 2, e.g., PD-id2, may use PK3 to access Domain 2's code. The PKR includes PK11 because domain 1's SharedCode Key List indicates that all other domains, e.g., "*", may use PK11 to access Domain 1's code. PKR includes PK12 because domain 1's SharedData Key List indicates that all other domains, e.g., "*", may use PK11 to access Domain 1's data.

While executing the code of domain 3, according to one embodiment, the PKR may include "PK3, PK11, PK12." PKR includes PK3 because that is the Private Key of domain 3. The PKR includes PK11 because domain 1's SharedCode Key List indicates that all other domains, e.g., "*", may use PK11 to access Domain 1's code. PKR includes PK12 because domain 1's SharedData Key List indicates that all other domains, e.g., "*", may use PK11 to access Domain 1's data.

According to another embodiment, the computer hardware saves and restores the contents of whatever register contains values of domain attributes for cross-domain switches. In the case of the IPF architecture, the hardware would save and restore the contents of the PKR during cross-domain switches. Continuing the example depicted in Table 2, while executing code associated with domain, the PKR may contain "PK1, PK11, PK12." if cross-domain switching occurs between domain 1 and domain 2, then the values "PK1, PK11, PK12" may be stored and the PKR may be initialized with the values "PK2, PK3, PK11, PK12." When control switches back from the code of domain 2 to the code of domain 1, the values "PK2, PK3, PK11, PK12" may be stored and the PKR may be re-initialized with the values "PK1, PK11, PK12."

Although Table 1 depicts rings 1-3, the rings could be any rings in a Multics architecture where main( ) is in a ring that has a lower level of trust than the rings that SQL/MX and the user library reside in, user library is in a ring that has more trust than the rings that SQL/MX and main( ) reside in, and SQL/MX is in a ring that has a level of trust between the rings that main( ) and user library reside in.

Although embodiments of the present invention may be used to implement a linear relationship between types of protection and portions of code, as depicted in Table 2, embodiments of the present invention do not require the relationship between types of protection and portions of code to be linear, as described in the operational example pertaining to Table 1.

Hardware Overview

Figure 4:
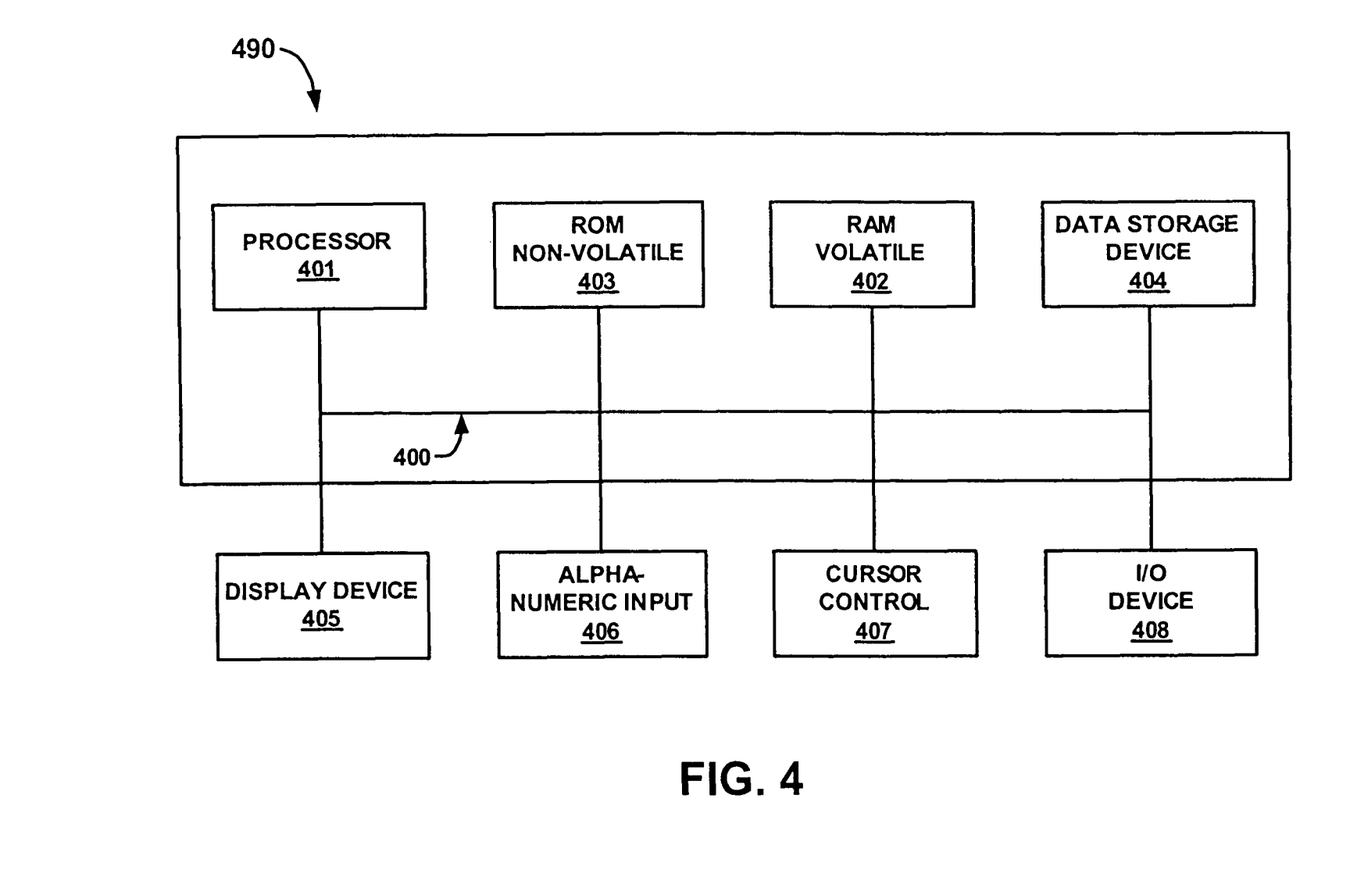
FIG. 4 depicts a block diagram of an exemplary computer system upon which embodiments of the present invention may be practiced.

FIG. 4 illustrates an exemplary computer system 490 upon which embodiments of the present invention may be practiced. In general, computer system 490 comprises bus 400 for communicating information, processor 401 coupled with bus 400 for processing information and instructions, random access (volatile) memory (RAM) 402 coupled with bus 400 for storing information and instructions for processor 401, read-only (non-volatile) memory (ROM) 403 coupled with bus 400 for storing static information and instructions for processor 401, data storage device 404 such as a magnetic or optical disk and disk drive coupled with bus 400 for storing information and instructions, an optional user output device such as display device 405 coupled to bus 400 for displaying information to the computer user, an optional user input device such as alphanumeric input device 406 including alphanumeric and function keys coupled with bus 400 for communicating information and command selections to processor 401, and an optional user input device such as cursor control device 407 coupled to bus 400 for communicating user input information and command selections to processor 401. Furthermore, an optional input/output (I/O) device 408 is used to couple computer system 490 onto, for example, a network.

Display device 405 utilized with computer system 490 may be a liquid crystal device, cathode ray tube, or other display device suitable for creating graphic images and alphanumeric characters recognizable to the user. Cursor control device 407 allows the computer user to dynamically signal the two-dimensional movement of a visible symbol (pointer) on a display screen of display device 405. Many implementations of the cursor control device are known in the art including a trackball, mouse, joystick or special keys on alphanumeric input device 406 capable of signaling movement of a given direction or manner of displacement. It is to be appreciated that the cursor control 407 also may be directed and/or activated via input from the keyboard using special keys and key sequence commands. Alternatively, the cursor may be directed and/or activated via input from a number of specially adapted cursor directing devices.

In the present embodiment, software systems 200A and 200B may be implemented on a computer system, such as computer system 490.

CONCLUSION

By dividing the code of an application into portions, such as domains, and associating types of protection, such as domain attributes, with those portions of code, embodiments of the present invention decouple privilege from protection. Hence, the code can be provided a high level of protection while executing in with a low level of privilege, such as the user level, while at the same time reducing overhead by avoiding context switching, preserving kernel stability, and eliminating the need for application program developers to obtain approval from kernel program developers to place the application code in the kernel.

EXTENSIONS AND ALTERNATIVES

Although many of the embodiments of the present invention were described using the IPF architecture, the embodiments may be implemented on any computer architecture that provides page level protection.

Although certain embodiments of the present invention were described with portions of code in the user level, the present invention may be used to associate different types of protection with portions of code in the kernel as well.

Although certain embodiments of the present invention were described storing values of domain attributes in the headers of executables, other mechanisms for storing the values of the domain attributes may be used. For example, in most computer architectures and operating systems the values of the domain attributes may be stored in a database. In the case of the Multiple Virtual Storage (MVS) operating system running on a mainframe, the values may alternatively be stored in a Virtual Storage Access Method (VSAM) data set.

Although certain embodiments of the present invention were described maintaining values of domain attributes in the headers of executables, other mechanisms for maintaining the values of the domain attributes may be used. For example, in most computer architectures and operating systems the values of the domain attributes may be maintained in a database. In the case of the Multiple Virtual Storage (MVS) operating system running on a mainframe, the values may alternatively be maintained in control blocks or in a Virtual Storage Access Method (VSAM) data set.

Although certain embodiments of the present invention were described where relationships between types of protection and portions of code were specified using domain id to key pairs, other mechanisms such as databases may be used for maintaining these relationships.

What is claimed is:

1. A method comprising:
providing, in a computer system, domains including respective portions of code;
receiving, in the computer system, information describing corresponding types of protection for the domains, said information specifying that the portion of code of a first of the domains is permitted to invoke the portion of code of a second of the domains, and indicating that the portion of code of a third of the domains is not permitted to invoke the portion of code of the second domain, and said information includes attributes associated with the second domain, the attributes including identifiers of multiple ones of the plurality of domains and respective one or more private keys to be used for accessing the portion of code of the second domain;
receiving, in the computer system, information describing a relationship between said types of protection and said portions of code that are executed in a same privilege level of the computer system, wherein said relationship is not required to be linear;
associating, in the computer system, said information describing said types of protection and said information describing said relationship with said portions of code; and
during execution of the portion of code of the first domain, determining, by a manager in the computer system, whether the portion of code of the first domain is permitted to access the portion of code of the second domain, based on the information describing the corresponding types of protection and the information describing the relationship.

2. The method of claim 1, wherein each of said types of protection is defined at least in part by one or more domain attributes of the domains.

3. The method of claim 2, wherein said one or more domain attributes include a domain identifier that specifies a unique value for a particular one of the domains.

4. The method of claim 2, wherein said one or more domain attributes include a private key that specifies a unique value for protecting each user that concurrently uses a particular one of the domains.

5. The method of claim 2, wherein said one or more domain attributes include a key that the portion of code of a particular one of the domains is to use to access the portion of code of another of the domains in conjunction with said particular domain performing cross-domain switching to the another of the domains.

6. The method of claim 2, wherein said one or more domain attributes include a key that is used to request access of the portion of code of a particular one of the domains on behalf of another of the domains.

7. The method of claim 1, wherein the information describing the corresponding types of protection further includes information specifying that cross-domain switching is to be performed to permit the portion of code of a fourth of the domains to access the portion of code of the second domain.

8. A method of providing flexible protection by decoupling protection from privilege, the method comprising:
detecting, in a computer system, a request from a first portion of code in a first domain to invoke a second portion of code in a second domain, wherein said first and second portions of code are executed in a same privilege level of said computer system;
determining, in the computer system, whether said first portion of code is permitted to invoke said second portion of code based on information describing types of protection and also based on information describing a relationship between said types of protection and said portions of code, wherein said relationship is not required to be linear, wherein said information describing said types of protection specifies that said first portion of code in the first domain is permitted to invoke said second portion of code in the second domain, and indicating that a portion of code in a third domain is not permitted to invoke said second portion of code in the second domain, wherein the information describing the types of protection includes attributes associated with the second domain, the attributes including identifiers of multiple domains and respective one or more private keys to be used for accessing said second portion of code in the second domain;
in response to said information describing said types of protection and said information describing the relationship specifying that said first portion of code is permitted to invoke said second portion of code, then
allowing said first portion of code to invoke said second portion of code;
else
not allowing said first portion of code to invoke said second portion of code.

9. The method of claim 8, wherein said information describing said types of protection and said information describing said relationship are associated with said portions of code, and wherein the method further comprises retrieving said information describing said types of protection and said information describing said relationship.

10. A computer system comprising:
a memory unit; and
a processor coupled to the memory unit, the processor for executing instructions for enforcing protection in the computer system by decoupling protection from privilege, the instructions executable on the processor to:
provide a plurality of domains including respective portions of code;
receive information describing corresponding types of protection, said information specifying that the portion of code of a first of the domains is permitted to invoke the portion of code of a second of the domains, and indicating that the portion of code of a third of the domains is not permitted to invoke the portion of code of the second domain, wherein the information describing the corresponding types of protection includes a private key that the portion of code of the first domain is to use to access the portion of code of the second domain;
receive information describing a relationship between said types of protection and said portions of code that are executed in a same privilege level of the computer system, wherein said relationship is not required to be linear; and
associate, by a link-editor, said information describing said types of protection and said information describing said relationship with said portions of code.

11. A computer system comprising:
a memory unit; and
a processor coupled to the memory unit, the processor for executing instructions for providing flexible protection in the computer system by decoupling protection from privilege, the instructions executable in the processor to:

detect at a memory manager a request from a first portion of code on a first domain to invoke a second portion of code in a second domain, wherein said first and second portions of code are executed in a same privilege level of said computer system;

determine at said memory manager whether said first portion of code is permitted to invoke said second portion of code based on information describing types of protection and also based on information describing a relationship between said types of protection and said portions of code, wherein said relationship is not required to be linear, wherein said information describing said types of protection specifies that said first portion of code in the first domain is permitted to invoke said second portion of code in the second domain, and indicating that a portion of code in a third domain is not permitted to invoke said second portion of code in the second domain, wherein the information describing the types of protection includes an attribute associated with the second domain, the attribute including an identifier of the first domain and a respective private key to be used for accessing the portion of code of the second domain;

in response to said information describing said types of protection and said information describing the relationship specifying that said first portion of code is permitted to invoke said second portion of code, then allowing at said memory manager said first portion of code to invoke said second portion of code;

else not allowing at said memory manager said first portion of code to invoke said second portion of code.

12. The computer system of claim 11, wherein said information describing said types of protection and said information describing said relationship are associated with said portions of code, and wherein the instructions are executable on the processor to further retrieve at a loader said information describing said types of protection and said information describing said relationship.

13. A non-transitory computer-usable medium having computer-readable program code embodied therein for causing a computer system to perform a method of providing flexible protection in a computer system by decoupling protection from privilege, the method comprising:

providing a plurality of domains including respective portions of code;

receiving information describing corresponding types of protection for the domains, said information specifying that the portion of code of a first of the domains is permitted to invoke the portion of code of a second of the domains, and indicating that the portion of code of a third of the domains is not permitted to invoke the portion of code of the second domain, wherein the information describing the corresponding types of protection includes a private key that the portion of code of the first domain is to use to access the portion of code of the second domain, the computer-readable program code for causing the computer system to further:

during execution of the portion of code of the first domain, determine whether the portion of code of the first domain is permitted to access the portion of code of the second domain, based on the information describing the corresponding types of protection and the information describing the relationship;

receiving information describing a relationship between said types of protection and said portions of code that are executed in a same privilege level of the computer system, wherein said relationship is not required to be linear; and associating said information describing said types of protection and said information describing said relationship with said portions of code.

14. The computer-usable medium of claim 13, wherein each of said types of protection is defined at least in part by one or more domain attributes of the domains.

15. The computer-usable medium of claim 14, wherein said one or more domain attributes include a domain identifier that specifies a unique value for a particular one of the domains.

16. The computer-usable medium of claim 14, wherein said one or more domain attributes include a private key that specifies a unique value for protecting each user that concurrently uses a particular one of the domains.

17. The computer-usable medium of claim 14, wherein said one or more domain attributes include a private key that the portion of code of a particular one of the domains is to use to access the portion of code of another of the domains.

18. The computer-usable medium of claim 17, wherein said one or more domain attributes include a data key that the portion of code of the particular one of the domains is to use to access data of the another of the domains, the data key distinct from the private key.

19. The computer-usable medium of claim 14, wherein said one or more domain attributes include a key that the portion of code of a particular one of the domains is to use to access the portion of code of another of the domains in conjunction with said particular domain performing cross-domain switching to the another domain.

* * * * *

UNITED STATES PATENT AND TRADEMARK OFFICE
CERTIFICATE OF CORRECTION

| | | |
|---|---|---|
| PATENT NO. | : 9,152,785 B2 | Page 1 of 1 |
| APPLICATION NO. | : 10/769594 | |
| DATED | : October 6, 2015 | |
| INVENTOR(S) | : Ahmed K. Ezzat | |

It is certified that error appears in the above-identified patent and that said Letters Patent is hereby corrected as shown below:

In the Claims

In column 15, line 8, in Claim 1, delete "system, domains" and insert -- system, a plurality of domains --, therefor.

Signed and Sealed this
Fifteenth Day of March, 2016

Michelle K. Lee
*Director of the United States Patent and Trademark Office*